(12) United States Patent
Corpier et al.

(10) Patent No.: US 8,924,218 B2
(45) Date of Patent: Dec. 30, 2014

(54) AUTOMATED PERSONAL ASSISTANCE SYSTEM

(76) Inventors: Greg L. Corpier, Sedalia, MO (US); Katie J. Boyer, Leavenworth, KS (US)

( * ) Notice: Subject to any disclaimer, the term of this patent is extended or adjusted under 35 U.S.C. 154(b) by 496 days.

(21) Appl. No.: 13/306,755

(22) Filed: Nov. 29, 2011

(65) Prior Publication Data

US 2012/0136666 A1 May 31, 2012

Related U.S. Application Data

(60) Provisional application No. 61/417,815, filed on Nov. 29, 2010.

(51) Int. Cl.
| | | |
|---|---|---|
| *G10L 21/00* | (2013.01) |
| *G10L 21/06* | (2013.01) |
| *G10L 25/00* | (2013.01) |
| *B60L 9/00* | (2006.01) |
| *B60L 11/00* | (2006.01) |
| *G05D 1/00* | (2006.01) |
| *G01C 22/00* | (2006.01) |
| *G06F 7/00* | (2006.01) |
| *G06F 17/00* | (2006.01) |
| *A61G 5/02* | (2006.01) |
| *H04L 12/28* | (2006.01) |
| *G10L 13/00* | (2006.01) |
| *G10L 15/00* | (2013.01) |

(52) U.S. Cl.
CPC ............ *H04L 12/2829* (2013.01); *A61G 5/024* (2013.01); *G10L 13/00* (2013.01); *G10L 15/00* (2013.01); *A61G 2203/36* (2013.01)
USPC ........ 704/271; 704/270; 704/270.1; 704/275; 701/22; 701/24; 701/27

(58) Field of Classification Search
USPC ........................ 704/231, 246, 270, 270.1, 275
See application file for complete search history.

(56) References Cited

U.S. PATENT DOCUMENTS

| 4,570,739 A | 2/1986 | Kramer |
| 5,513,716 A * | 5/1996 | Kumar et al. .................. 180/8.3 |

(Continued)

FOREIGN PATENT DOCUMENTS

| JP | 2009277063 A | * 11/2009 |
| KR | 2003028351 A | * 4/2003 |

OTHER PUBLICATIONS

AT Sciences, "Smart Power-Assist Module", http://www.at-sciences.com/projects/powerassist.html; Accessed Nov. 16, 2010.

(Continued)

*Primary Examiner* — Richemond Dorvil
*Assistant Examiner* — Olujimi Adesanya
(74) *Attorney, Agent, or Firm* — Law Office of Mark Brown, LLC; Mark E. Brown (57) ABSTRACT

An automated personal assistance system employing artificial intelligence technology that includes speech recognition and synthesis, situational awareness, pattern and behavioral recognition, and the ability to learn from the environment. Embodiments of the system include environmental and occupant sensors and environmental actuators interfaced to an assistance controller having the artificial intelligence technology incorporated therein to control the environment of the system. An embodiment of the invention is implemented as a vehicle which reacts to voice command for movement and operation of the vehicle and detects objects, obstructions, and distances. This invention provides the ability to monitor for the safety of operation and modify dangerous maneuvers as well as to learn locations in the environment and to automatically find its way to them. The system may also incorporate communication capability to convey patterns of environmental and occupant parameters and to a monitoring center.

1 Claim, 8 Drawing Sheets

(56) References Cited

U.S. PATENT DOCUMENTS

| | | | |
|---|---|---|---|
| 5,673,637 A | 10/1997 | Colburn, Jr. et al. | |
| 5,812,978 A * | 9/1998 | Nolan | 704/275 |
| 5,944,131 A | 8/1999 | Schaffner et al. | |
| 6,108,592 A * | 8/2000 | Kurtzberg et al. | 701/1 |
| 6,290,011 B1 | 9/2001 | Langaker et al. | |
| 6,774,795 B2 * | 8/2004 | Eshelman et al. | 340/573.1 |
| 6,842,692 B2 | 1/2005 | Fehr et al. | |
| 7,204,328 B2 | 4/2007 | LoPresti | |
| 7,263,509 B2 | 8/2007 | Lee et al. | |
| 7,389,208 B1 | 6/2008 | Solinsky | |
| 7,536,309 B1 | 5/2009 | Vasko et al. | |
| 7,765,029 B2 * | 7/2010 | Fleischer et al. | 700/250 |
| 7,914,468 B2 * | 3/2011 | Shalon et al. | 600/590 |
| 8,583,286 B2 * | 11/2013 | Fleischer et al. | 700/259 |
| 2001/0048291 A1 * | 12/2001 | Lautzenhiser et al. | 323/234 |
| 2002/0067282 A1 * | 6/2002 | Moskowitz et al. | 340/825.19 |
| 2004/0006422 A1 * | 1/2004 | Fehr et al. | 701/200 |
| 2004/0267442 A1 * | 12/2004 | Fehr et al. | 701/200 |
| 2005/0096098 A1 * | 5/2005 | Woods | 455/569.1 |
| 2005/0267826 A1 * | 12/2005 | Levy et al. | 705/34 |
| 2005/0275322 A1 * | 12/2005 | Mosel et al. | 312/312 |
| 2005/0279551 A1 * | 12/2005 | LoPresti | 180/167 |
| 2007/0100511 A1 * | 5/2007 | Koerlin | 701/1 |
| 2007/0219711 A1 * | 9/2007 | Kaldewey et al. | 701/208 |
| 2007/0299371 A1 * | 12/2007 | Einav et al. | 601/5 |
| 2008/0300777 A1 * | 12/2008 | Fehr et al. | 701/200 |
| 2011/0130940 A1 * | 6/2011 | Smithers et al. | 701/99 |
| 2011/0168478 A1 * | 7/2011 | Kuo et al. | 180/315 |

OTHER PUBLICATIONS

Jewish World Review, "Ralph, a computer, helps man with polio live at home alone", http://www.jewishworldreview.com/0703/tech_report.asp; Accessed Oct. 8, 2010.

* cited by examiner

AUTOMATED PERSONAL ASSISTANCE SYSTEM

CROSS-REFERENCE TO RELATED APPLICATION

This application claims priority in U.S. provisional patent application Ser. No. 61/417,815, filed Nov. 29, 2010, which is incorporated herein by reference.

BACKGROUND OF THE INVENTION

1. Field of the Invention

The present invention generally relates to automated personal assistance systems and, more particularly, to automated systems of assistance devices that allow persons using the systems to access, manage, traverse, and sense their residence or surroundings through non-traditional means.

2. Description of the Related Art

Persons become disabled to greater or lesser degrees as a result of injuries, diseases, aging, and the like. Such disabilities may include physical limitations such as paralysis, lack of strength in various muscles, balance challenges, mobility limitations, sensory limitations, and the like. The disabilities may also include mental issues such as forgetfulness, emotional changes, euphoria/depression, speech difficulties, and the like. In many cases, the disabled persons are able to compensate for their disabilities to such an extent that they can live independent lives in their existing homes. In other cases, the persons must be placed in care facilities so that their needs can be met. A sudden change from familiar surroundings and people to unfamiliar places populated by strangers can induce relocation trauma which can affect the acceleration of biopsychosocial changes in adults already compromised. Thus, there are significant motivations to maintain persons with disabilities in familiar surroundings and with convenient access to family and friends, to the extent possible.

Current technologies provide many types of remote controls, computerized controls, and speech controls, as well as various types of monitoring devices. Many of these types of controls have been adapted for controlling lighting and temperature within residences. For example, computerized thermostat controls are common and can be programmed to maintain varying temperatures on particular days and at particular times of the day. Similarly, lighting controls can be programmed to illuminate at certain times of the night or day. Lighting controls for sensing the presence of a human and illuminating a room only when a person enters the room are known. Systems for monitoring elevated temperatures, smoke, carbon monoxide, and natural gas are well known and are often interfaced with dialing mechanisms to communicate dangerous conditions to monitoring centers. Intrusion detectors and systems which detect and record and/or report instances and times of openings and closings of doors are well known. Devices for remotely summoning help are available, such as devices which can be worn by elderly persons to summon help when falls occur.

The availability of such control and monitoring devices are typically made use of in what may be described as an a la carte approach on an as-needed basis. Even on this basis, they have provided some assistance to persons having various kinds of disabilities and limitations.

A fairly common type of disability is a limitation in mobility, that is, the ability of a person to move safely and conveniently about a residence or in environments external to the home. Mobility limitations can range from balance and stamina problems to degrees of paralysis of the legs and lower body to amputations of the feet and legs. In the past, the solution to mobility limitations was typically an unpowered wheelchair which could be propelled by the occupant or pushed by another person. More recently, wheelchairs powered by electric motors combined with manual or electrical steering controls have been developed. Additionally, vehicles referred to as scooters, power chairs, or personal mobility vehicles have been developed, such as those disclosed in U.S. Pat. Nos. 4,570,739; 5,944,131; and 6,290,011, which are incorporated herein by reference. The use of the term "wheelchair" herein is meant to encompass more traditional styles of wheelchairs as well as vehicles having similar functionality, such as scooters, power chairs, personal mobility vehicles, and the like.

The current state of the art wheelchair technology uses joysticks or adaptive devices, such as blow tubes, to control the movement of the wheelchair. These adaptive devices currently use microprocessors as simple controllers. Because of the simple controllers, current motorized wheelchairs require the occupant to drive the wheelchair with a mechanical control, such as a joystick, moving to simulate the direction in which the occupant wants to move. In addition, these wheelchairs use rudimentary speed controls. For example, the farther the occupant moves the joystick, the faster the occupant goes. With this technology, the occupant must have the physical mobility and dexterity to adjust a slide or thumbwheel manually to set the range of speed.

Efforts have been made to provide autonomous or semi-autonomous controls for wheelchairs to enable automatic navigation of the chair. An example of such an autonomous wheel chair navigation system is disclosed in U.S. Pat. No. 6,842,692 which is incorporated herein by reference. Typically, such automatically navigating wheelchairs make use of stored coordinates of pre-defined paths referenced to special markers to enable movement from reference positions along the stored paths to stored designations. A problem with this type of approach is that such a system is not able to automatically learn and adapt to changes in the environment, such as the relocation of pieces of furniture, appliances, or the like.

SUMMARY OF THE INVENTION

The present invention provides embodiments of automated residential personal assistance systems. An embodiment of a system includes a plurality of residential sensors installed at a residence which sense respective environmental parameters of the residence, a plurality of occupant sensors sensing parameters of an occupant of the residence which may include the current location of the occupant within the residence, a plurality of environmental actuators controllable to vary the environmental parameters of the residence, and an assistance controller having the sensors and actuators interfaced thereto and programmed to vary the environmental parameters by way of the actuators in response to patterns and histories of values of the environmental and occupant parameters. The system may also include a speech recognition unit including a microphone which receives and interprets vocal commands from the occupant to vary the environmental parameters.

The environmental actuators may include devices such as controls for lighting, heating and cooling, opening and closing of windows and doors, opening and closing of window coverings such as blinds or shades, and the like. The environmental actuators may also include appliances, such as a television set, a sound system, or the like. The sensors may include measuring devices such as for measuring temperature within rooms of the residence, for sensing the state of environmental devices, such as the on/off state of a light unit, the open/closed state of a door, or the like. The environmental sensors may also monitor conditions which affect safety of the occupant such as sensors for elevated temperatures, smoke, carbon monoxide, natural gas, and the like. The occupant sensors may include infrared sensors to sense the presence of an occupant in a room, ultrasonic transducers to determine the location of an occupant within the room, and the like.

The present invention provides embodiments of the automated personal assistance system in which the combination of home automation sensors and actuators is controlled by artificial intelligence programming of the assistance controller and may be further directed by speech, touch screen, or other directive devices. These embodiments of the system allow a person to sense and manage their environment. The artificial intelligence programming learns the environments via the sensors, stores that information, and makes that information available when prompted as well as controls environmental devices and other environmental conditions by means of the environmental actuators and according to programmed hierarchies of sensed conditions and schedules. The assistance controller may also be programmed with limit values of certain environmental or occupant parameters which affect occupant safety and react to values outside of the limits by contacting a monitoring party, a fire or police department, or the like.

The stored information about the environment can also be shared in a community of related subsystems or devices. One device can learn the environment and then share that information with other devices within the same environment or a similar environment.

Alternative embodiments include sensors that can also track daily living activities of a person. Current activities may be tracked via the occupant and environmental sensors, evaluated against general information about specific daily living requirements to track trends, compare activities, and report or react as needed for given situations or discoveries. Embodiments of the automated personal assistance system may include a telecommunication device, such as a modem device or an internet connection to regularly communicate reports of environmental and occupant parameters to a remote monitoring party, to report selected patterns of values of the environmental and occupant parameters to the monitoring party, and to communicate with the monitoring party in response to vocal commands from the occupant.

An embodiment of the present invention relates to control and management systems for motorized wheelchairs and other personal transportation vehicles. In the practice of an aspect of the present invention, an automated personal assistance device is embodied in a personal mobility vehicle (PMV), such as a wheelchair, in a fixed-location system or in any type of assistance device. The assistance device incorporates artificial intelligence and advanced sensors. Control can be accomplished with or without manual input, thus accommodating individual users with varying degrees of mobility and dexterity. This invention removes the requirement that its users possess physical mobility or dexterity to control the speed, direction, and agility of the wheelchair, as well as manage environmental controls.

The device has the ability to "learn" its surroundings and take the occupant to a location using simple voice instruction. For example, the occupant can verbally instruct a wheelchair to go to a specific location. Using this invention's speech recognition system, the wheelchair takes the occupant to the desired location.

A major part of this innovation is the use of a hyper-visor (or virtual machine monitor (VMM)) to actually operate the wheelchair from the occupant's verbal directions, such as left, right, forward, back; along with travel distance; and other navigational instructions. Using this technology, the wheelchair can determine how to get to a location through verbal navigation instructions while mobile or by the wheelchair interpreting a single command that is the final destination, such as "refrigerator." After being given an instruction, the wheelchair then navigates to the location or in the direction, automatically detecting and avoiding objects and hazards along the way.

Other functions include virtual simulation of the environment. The wheelchair uses a continuously updated virtual simulation of the environment from its suite of sensors. These sensors provide the wheelchair with "situational awareness" of the environment and the ability to monitor any changes. This awareness allows the wheelchair to monitor the environment to provide safety and security of the occupant and quickly respond to his or her commands and needs. As a result, this awareness provides the wheelchair with the ability to anticipate and avoid inanimate objects as well as people or pets that move around in the environment. The sensor suite also monitors excess heat or cold, allowing this wheelchair to monitor for fires, and to sense other environmental situations such as doors or windows left open.

The innovation that enables the wheelchair to "learn" its environment and then monitor subtle changes in the occupant's abilities also maintains optimal safety for the occupant. In addition, the wheelchair can monitor, report, and adapt to subtle changes in the occupant's biopsychosocial activities.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
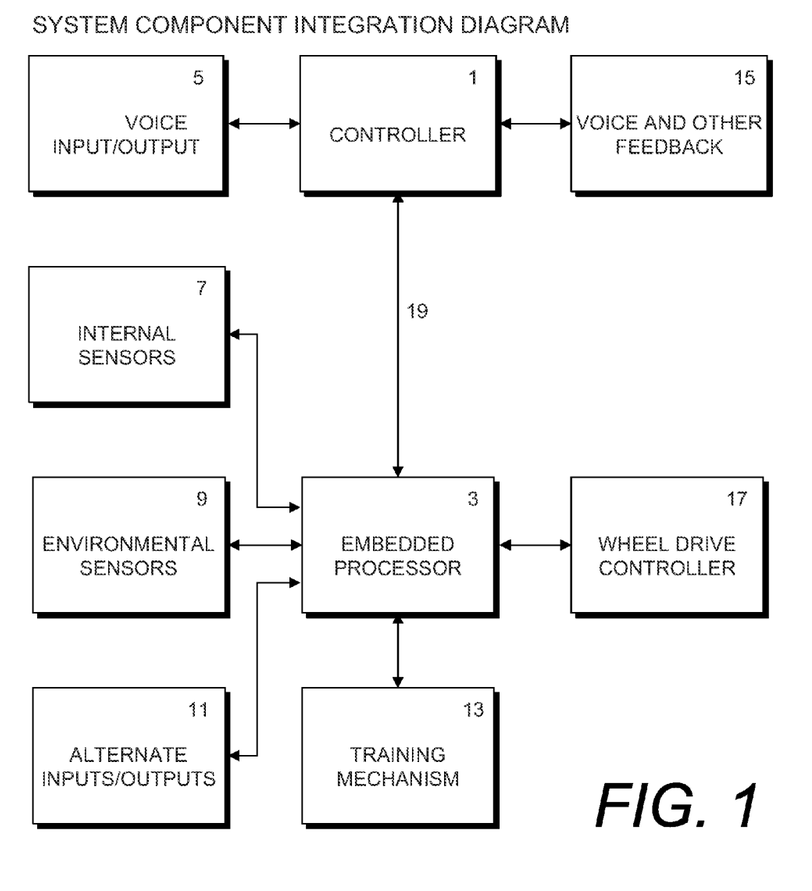
FIG. 1 is a block diagram of the components of an embodiment of an automated personal assistance system according to the present invention.

Referring now to the drawings in more detail, the reference number 10 generally designates an automated personal assistance system or device according to the present invention. Referring to FIG. 1, a system component integration diagram of an embodiment of high-level architecture of the assistance system or device 10 is illustrated. Given voice input/output at 5 and voice and other feedback at 15, an assistance controller 1 performs high-level intelligence and artificial reasoning processing. Internal sensors 7, environmental sensors 9, and alternate inputs/outputs 11 provide raw sensor information that an embedded processor 3 interprets to provide the sensor data and conditions to the controller 1. In an embodiment of the invention, the automated personal assistance system or device 10 is implemented as an automated personal assistance vehicle or enhanced personal mobility device 20 (FIG. 7), such as a wheelchair, scooter, power chair, or the like.

The embedded processor or vehicle processor 3 directs the wheelchair's operation based on the instructions from the controller 1 and informs it of sensor data and whether or not a task was completed. If not completed, the processor 3 can be programmed to notify the controller 1 why the instruction could not be completed. The embedded processor 3 is connected to a training mechanism 13 which may be used for training various functions of the system 10.

Figure 2:
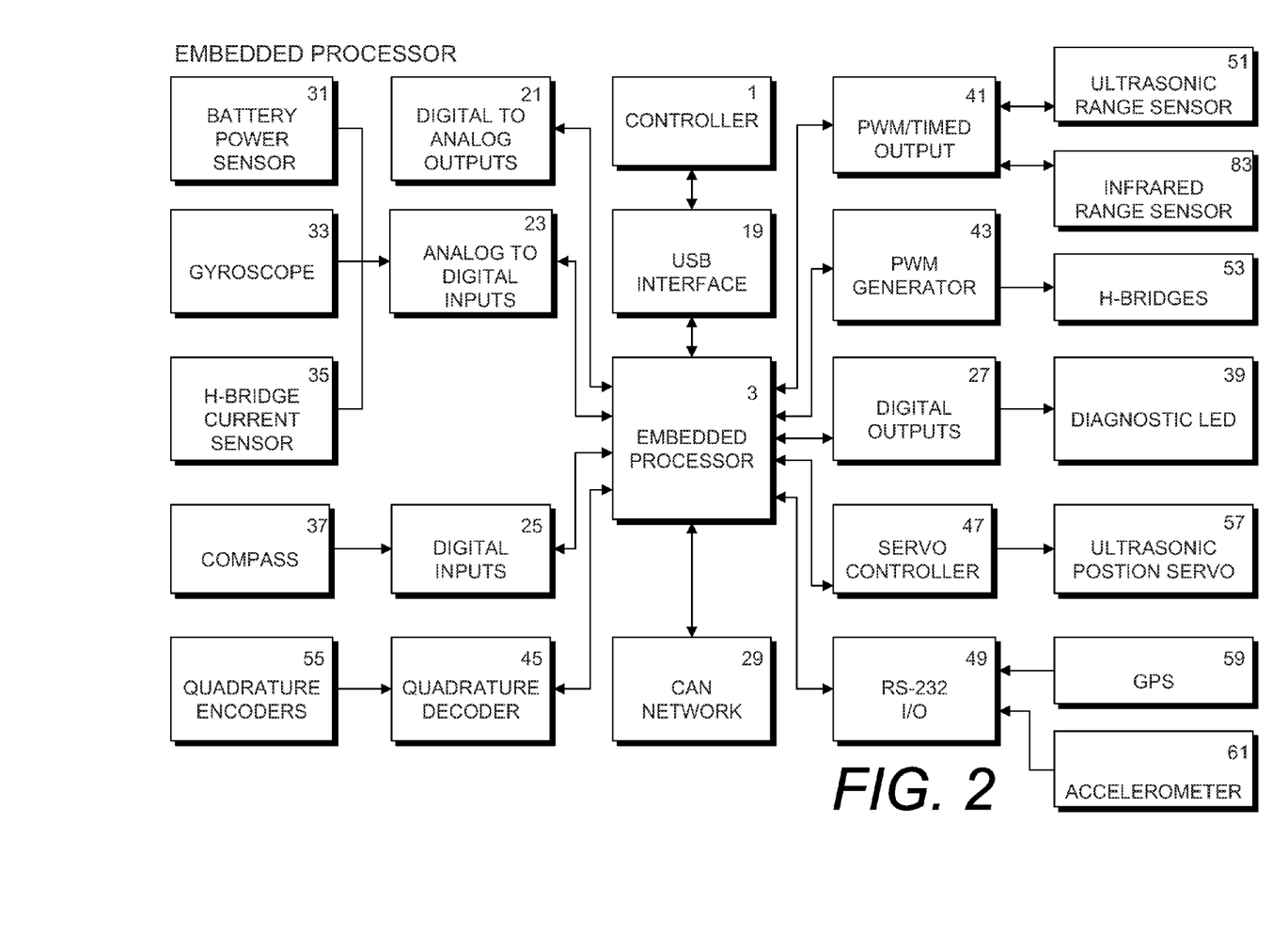
FIG. 2 is a block diagram of an embedded processor of the system.

FIG. 2 shows interfaces of various sensor inputs with the embedded processor 3 and various functions controlled by the embedded processor 3. The left side of FIG. 2 shows inputs to the processor 3, which are generally sensors. Analog inputs include information from a battery power sensor 31 for available power from a wheelchair battery 32 (FIG. 7) on the wheelchair 20, tilt and rotation information from one or more gyroscopes 33, and electrical current information from an H-bridge current sensor 35. An H-bridge is an electronic circuit that enables a voltage to be applied across a load in either direction. These circuits are often used in robotics and other applications to allow DC motors to run forwards and backwards, such as to control the direction of travel of the wheelchair 20. Analog signals from the battery sensor 31, the gyroscopes 33, and the H-bridge current sensor 35 are converted to digital inputs at an analog to digital or A/D converter 23.

Other analog signals that are converted to digital inputs include a compass 37, which provides directional information. A quadrature decoder 45 and encoders 55 provide input about the actual physical movement of the wheelchair 20. A quadrature encoder, also known as an incremental rotary encoder, measures the speed and direction of a rotating shaft or other member.

As shown in FIG. 2, sensors having digital inputs may be interfaced directly to the embedded processor 3 and require no conversion. These inputs appear on the right side of this diagram. FIG. 2 shows a PWM (Pulse Width Modulation) timed input 41 and ultrasonic range sensors 51, which are used for movement, a PWM generator 43, H-Bridges 53, a servo controller 47, and ultrasonic position servos 57, which are used for controlling positioning the wheelchair 20. Other inputs include a global positioning system or GPS 59 for position determination and one or more accelerometers 61 for acceleration or deceleration inputs, both of which provide the input and output required for an RS-232 I/O interface 49 or other type of interface. The accelerometers 61 can be combined with the gyroscopes 33 to form an inertial measurement unit (not shown) which can track accelerations along multiple axes and rotations about the axes. The GPS 59, the accelerometers 61, the gyroscopes 33, the compass 37, the quadrature encoders/decoders 55/45, and the ultrasonic range sensors 51 function as navigation sensors and cooperate to form a position coordinate system which determines the global and/or local position of the wheelchair 20 in an environment or a virtual map of the environment and navigational parameters such as the distance and direction to objects within the vicinity of the wheelchair 20. The controller 1 may be connected to the embedded processor 3 by a universal serial bus or USB interface 19 or other types of standard or propriety communication interfaces, such as Ethernet, Wi-Fi (trademark of Wi-Fi Alliance, www.wi-fi.org), Bluetooth (trademark of Bluetooth Special Interest Group, www.bluetooth.com), ZigBee (trademark ZigBee Alliance, www.zigbee.org), or the like. Digital-to-analog D/A) outputs are provided at 21 and are connected to the embedded processor 3. Digital inputs, outputs are provided at 25, 27. The digital outputs 27 are connected to a diagnostic LED 39. The embedded processor 3 may be adapted for interfaced to a CAN network 29. A Controller-Area Network (CAN or CAN-bus) is a vehicle bus standard designed to allow microcontrollers and devices to communicate with each other within a vehicle without a host computer.

Figure 3:
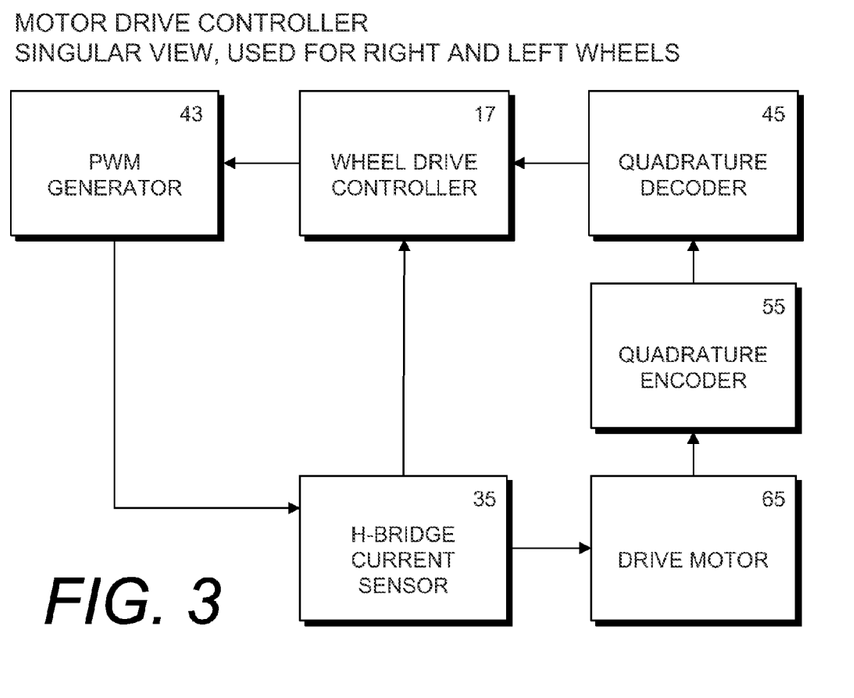
FIG. 3 is a block diagram of a motor drive controller of the system.
Figure 7:
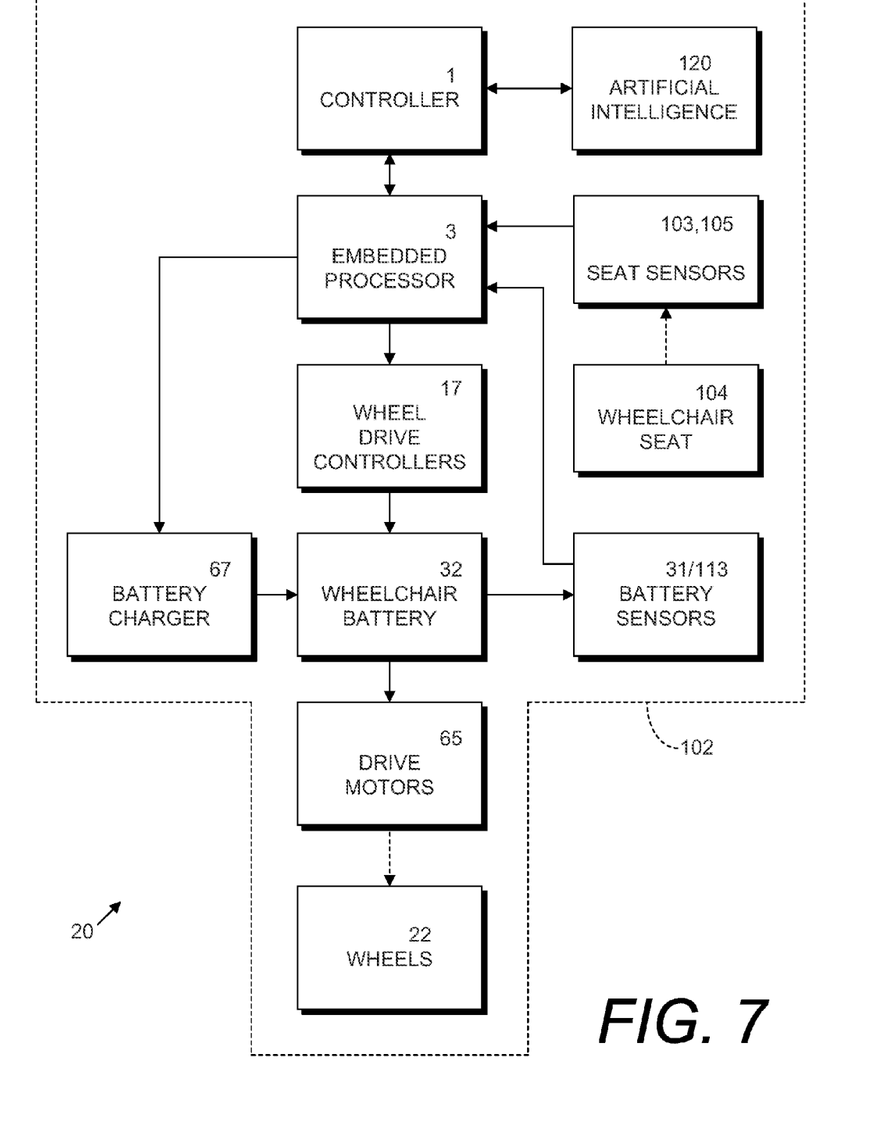
FIG. 7 is a block diagram illustrating additional components of an embodiment of a wheelchair according to the present invention.

FIG. 3 shows the mobility components of the system 10 implemented as an enhanced wheelchair 20, which uses two of the wheel drive controllers 17 as shown in FIG. 3, one for each of left and right wheels 22 (FIG. 7). The illustrated drive motor 65 drives one of the wheels 22. The quadrature encoder 55 and the quadrature decoder 45 register the movement in a forward or backward direction and speed of movement of the wheel 22. As shown in FIG. 3, the wheel drive controller 17 takes the current and speed of the motor to calculate the correction signal for the PWM generator 43. The PWM generator 43 takes that information and creates a variable duty cycle pulse-width modulated signal. That signal is used by the H-bridge current sensor 35 to apply the proper voltage and current to the drive motor 65 in the desired direction. The steering arrangement illustrated in FIG. 3 controls the direction of movement of the wheelchair 20 by differential activation of main wheels 22. It is foreseen that other steering arrangements could alternatively be employed in the system 10, such as activation of the wheels 22 in unison and an angle actuator connected to angularly steerable wheels (not shown).

Figure 4:
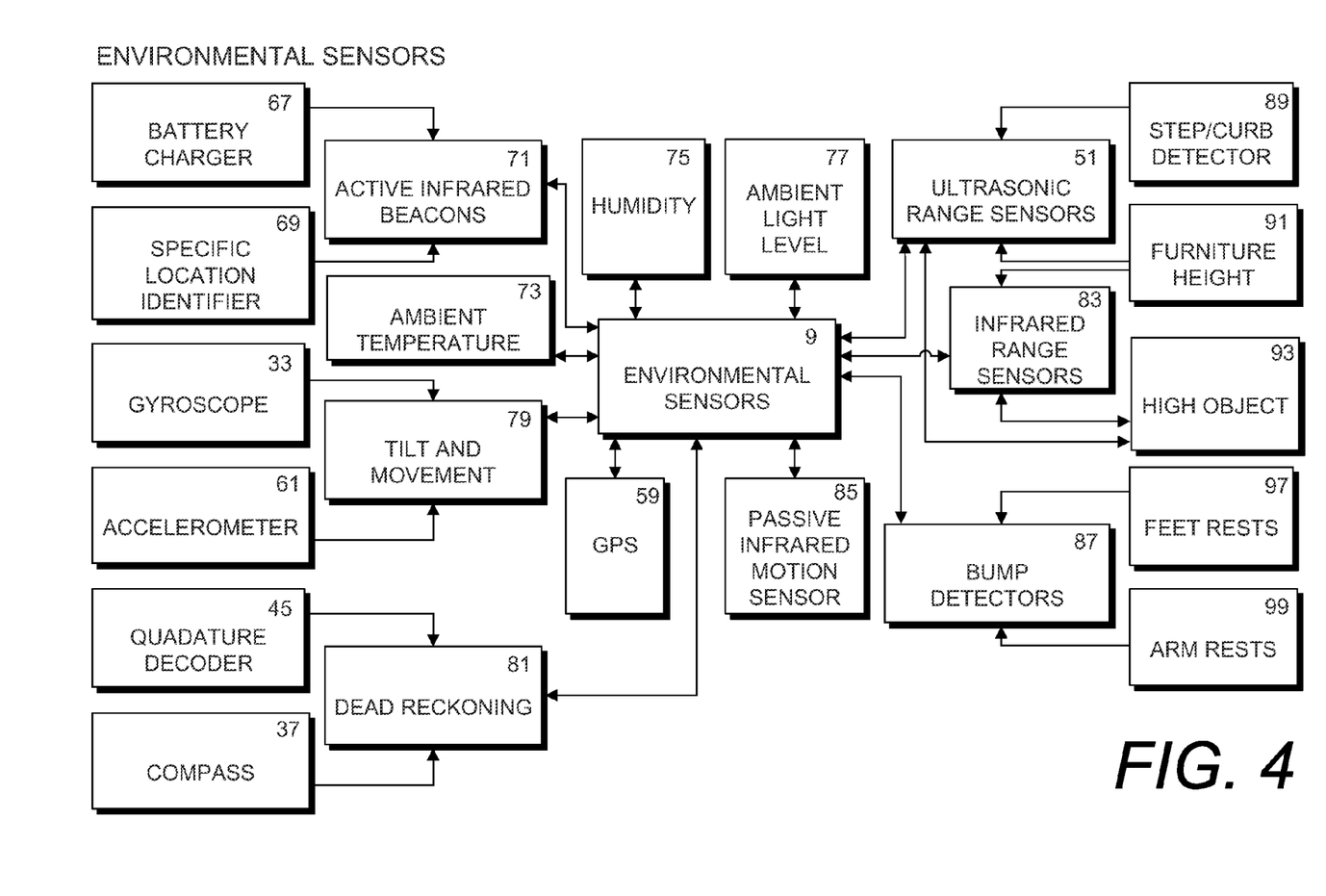
FIG. 4 is a block diagram of an environmental sensor suite of the system.

FIG. 4 is a diagram of sensors that monitor the environment of the automated personal assistance system 10. These sensors include information about the location of the wheelchair battery charger 67 and other specific location identifiers 69, as directed by active infrared beacons 71. This allows the wheelchair 20 to locate and move within range of the battery charger 67 when the battery monitor 31 provides input that a recharge is needed. Other environmental sensors detect ambient temperature 73, humidity 75, ambient light level 77, and tilt and movement 79 respectively.

The gyroscopes 33 and the accelerometers 61 sense angles of tilt and acceleration or deceleration of the wheelchair 20. A dead reckoning sensor 81 uses output signals from the compass 37 setting and feedback from the quadrature decoder 45, which counts the pulses to sense movement direction and distance traveled. As shown in FIG. 4, the GPS 59 determines the location of the wheelchair 20 under circumstances in which it can receive adequate signals from GPS satellites, such as outdoors and sometimes indoors. The ultrasonic range sensors 51 include step/curb detectors 89, which use ultrasound to detect these and other low height objects to avoid. They may also include furniture height sensors 91 to detect mid-height wheelchair obstacles. High object sensors 93 detect obstacles that are approximately level with the head of the occupant of the wheelchair 20. Infrared range sensors 83 may also detect furniture height 91 and high object 93 obstacles using infrared light. Other presence and motion detectors include the passive infrared motion sensor 85, which senses animate obstacles, such as people or pets, which are generally warmer than the surrounding environment. Bump detector sensors 87 in foot rests 97 and arm rests 99 may be provided to detect obstacles that appear in the way of either type of rest 97, 99.

Figure 5:
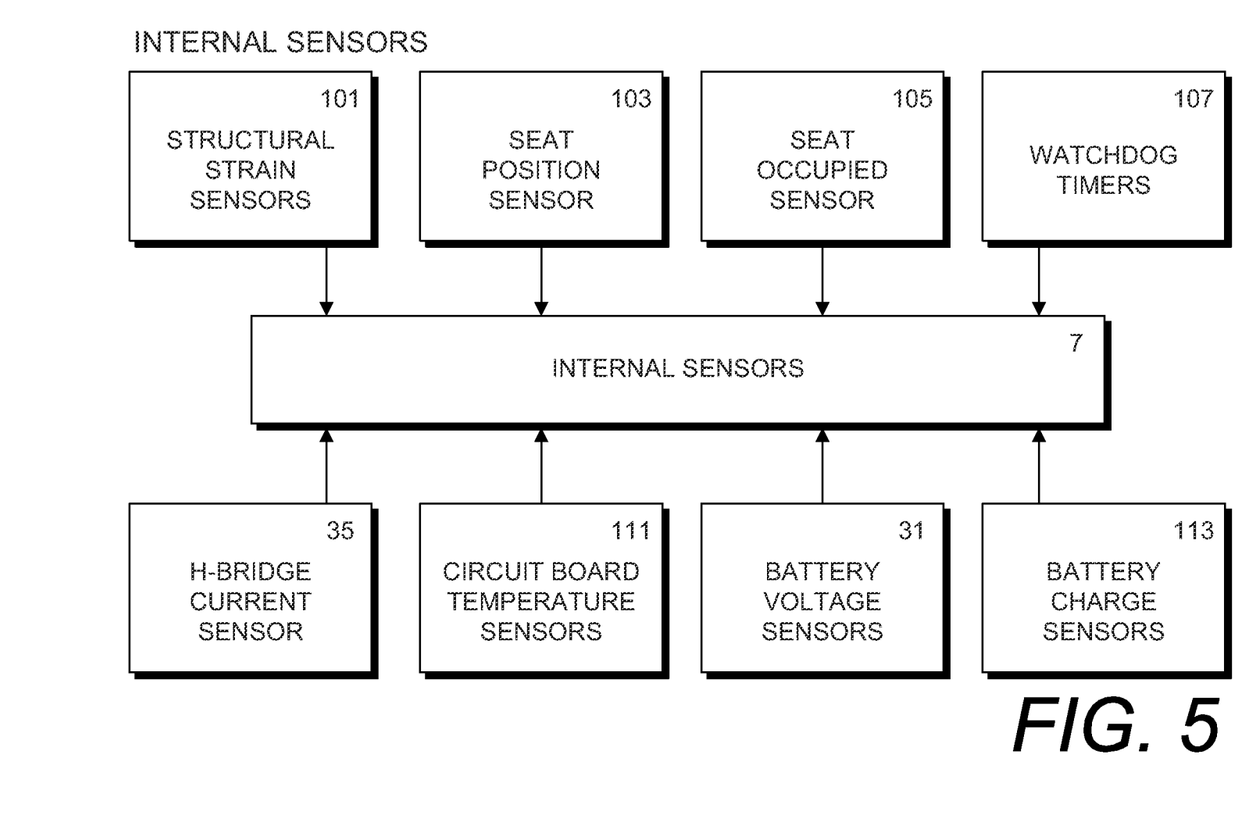
FIG. 5 is a block diagram of an internal sensor suite of the system.

FIG. 5 shows the internal sensors 7 of the wheelchair 20, which sense physical properties and parameters of the wheelchair 20. These sensors include structural strain sensors 101 positioned at suitable locations on a frame or framework 102 (FIG. 7) of the wheelchair 20 to detect if too much strain is on a portion of the wheelchair and seat position sensors 103 to detect seat position settings of the wheelchair seat 104. On some types of wheelchairs and personal mobility vehicles 20, the seat can be raised and lowered and pivoted about a vertical axis to facilitate activities of the occupant. A seat occupied sensor 105 detects whether there is an occupant in the wheelchair 20. Other sensors may include circuit board temperature sensors 111, which detect heat in various circuit boards, a battery voltage sensor 31 and battery charge sensors 113, which detect the voltage and conduct tests to determine the probable life of the battery 32.

Watchdog timers 107 provide a safety and reset function for confirming continued operation and resetting components as necessary. For example, components needing resetting can be automatically reset as soon as they cease normal operation. These timers 107 perform the ongoing testing and monitoring functions that ensure fully-functional operation.

Figure 6:
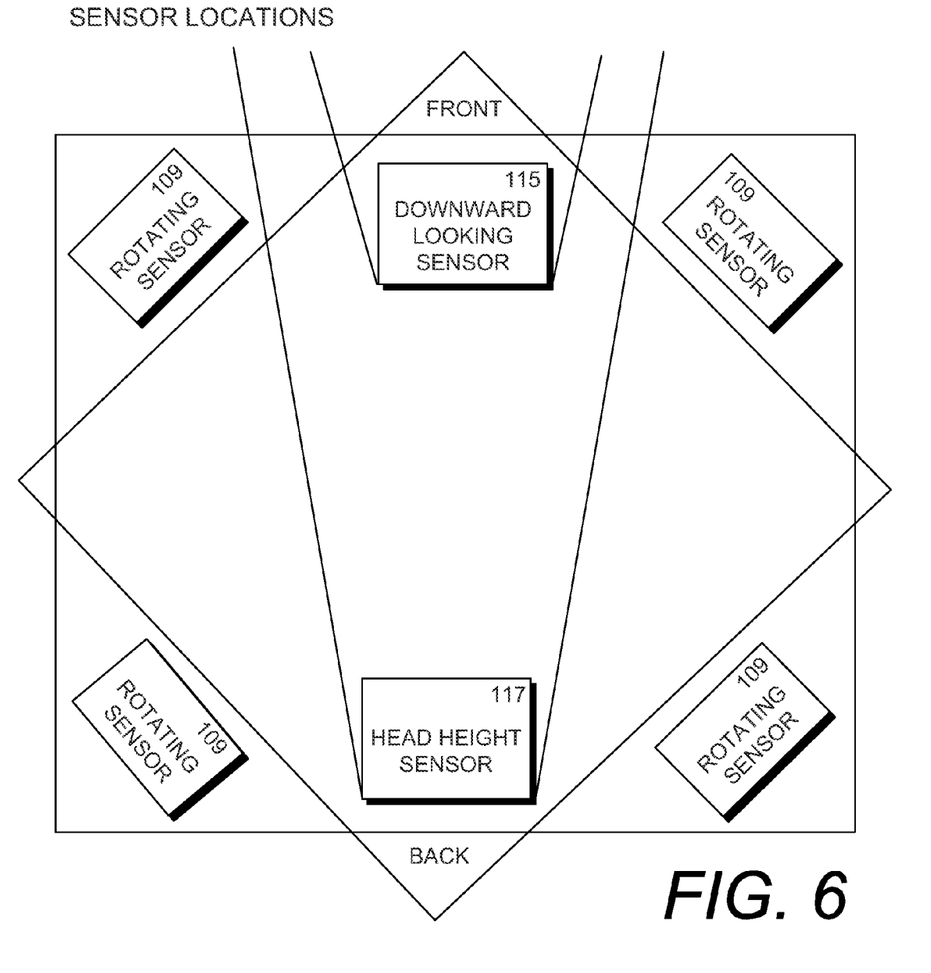
FIG. 6 is a diagrammatic plan view showing sensor locations on a wheelchair embodying an aspect of the present invention.

FIG. 6 graphically illustrates rotatable distance measuring sensors 109 and their configuration to detect objects and structures in the vicinity of the wheelchair 20. To detect in the four quadrants, the embedded processor 3 can cause each rotating sensor 109 to move through a range of 180° in 45° increments. Collectively the four sensors 109 cover a full 360° range of detection circumferentially around the wheelchair. In addition, a downward looking sensor 115 in the front of the chair looks down to detect curbs, ditches, steps, or obstructions in the front. One or more head height sensors 117 in the headrest detect higher, head-level obstructions.

Artificial intelligence is a system of programs and data structures that simulate human reaction and performance of tasks in a particular environment. This simulation includes the ability to learn via sensory inputs and multiple methods of feedback. The current embodiment 10 of the invention utilizes several algorithms including finite state modeling, virtual environment modeling, rules based inference and an expert system, genetic algorithms, and weighted responses based on feedback. Through the creation of a virtual simulation of the environment built from sensor data, historical data and learned waypoints, the simulation can achieve "situational awareness" and make decisions and calculations based on all the data available. The simulation can also run "what if" scenarios in virtual space to determine what action is the "best to use" in the situation at hand. Each of the scenarios may be applied to the genetic algorithms to determine the best result and each may be applied to the weighted responses to allow the simulation to "learn". Additional information disclosing aspects and uses of artificial intelligence can be found in U.S. Pat. Nos. 5,673,637; 7,263,509; and 7,389,208, which are incorporated herein by reference.

Artificial intelligence 120 is incorporated into the programming of the controller 1 to enable the system 10 to learn from data input through the various sensors to thereby develop a map of the layout of the environment as well as patterns of variation in the values of parameters input to the controller 1. By these means, the controller 1 can learn probable responses to inputs thereto. For example, the controller 1 can learn navigational paths from various reference positions in the environment, by use of the training mechanism 13. The controller 1 can then adapt to changes in the environment, such as rearrangement of furniture within the environment. The controller 1 can also process the appearance of new objects or movement of objects to detect the presence of humans or pets within the environment. When changes in the map of the environment are detected, the controller 1 can develop new paths from one known position to another.

Figure 8:
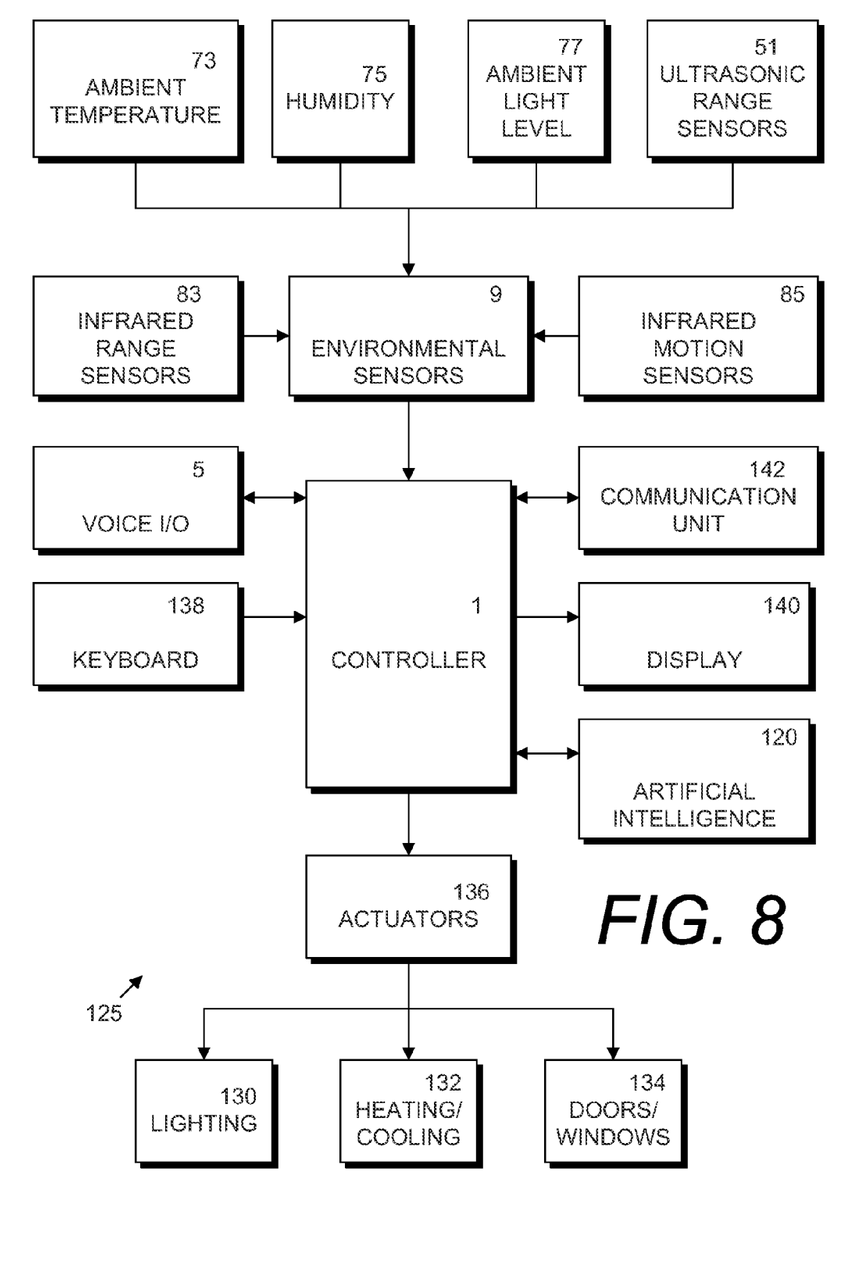
FIG. 8 is a block diagram illustrating components of an alternative embodiment of an automated personal assistance system according to the present invention.

While the automated personal assistance system 10 has been described in association with the enhanced wheelchair 20, the system 10 can be implemented without such a vehicle, for use by persons having specific disabilities other than mobility limitations. Referring to FIG. 8, an alternative embodiment 125 of the automated personal assistance system 10, according to the present invention, is illustrated. The system 125 makes use of the environmental sensors 9, such as ambient temperature sensors 73, humidity sensors 75, ambient light sensors 77, ultrasonic range sensors 51, infrared range sensors 83, infrared motion sensors 85, voice input 5 to detect environmental and occupant parameters of a residence and then control environmental functions such as lighting 130, heating/cooling 132, doors/windows 134, and other functions not shown by way of various actuators 136, such as controlled switches, valves, solenoids, motors, and the like. Control logic for the environmental functions may be programmed into the controller 1 and may be learned and further refined by alternative intelligence functionality 120 which is also programmed into the controller 1.

An occupant of a residence in which the system 125 is installed may input commands into the controller 1 by way of a voice input device 5, such as a microphone, which are interpreted by speech recognition programming within the controller 1. Alternatively, a keyboard 138 may be used. The controller 1 may communicate information and cautions to the occupant by way of a voice output 5, a display 140, or both. The alternative assistance system 125 operates in a manner similar to the system 10, as far as by learning patterns of parameters and providing appropriate responses to such patterns. The controller 1 may communicate with a remote monitoring party by way of a communication unit 142, such as a telephone dialer, an internet connection, or the like for regular reports of patterns of parameters or, in some cases, alert the monitoring party of unhealthy or hazardous situations which may be detected from such patterns by the programming of the controller 1. The monitoring party may then contact the occupant for further details or an emergency response agency, as appropriate to the situation.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

It is to be understood that while certain forms of the present invention have been illustrated and described herein, it is not to be limited to the specific forms or arrangement of parts described and shown.

What is claimed and desired to be secured by Letters Patent:

1. An automated personal assistance vehicle comprising:
   (a) a vehicle frame;
   (b) an occupant seat mounted on said frame;
   (c) vehicle wheels rotatably mounted on said frame;
   (d) a vehicle motor mounted on said frame and engaged with said wheels in such a manner as to propel and steer said vehicle when activated;
   (e) a battery coupled with said motor in such a manner as to selectively activate said motor;
   (f) a position coordinate system mounted on the frame to determine a location of said vehicle;
   (g) a navigation sensor mounted on said frame and operative to detect objects in a path of said vehicle and to derive navigational parameters therefrom in cooperation with said position coordinate system;
   (h) a speech recognition unit mounted on said frame and operative to convert vocal input from an occupant of said seat to coded vocal commands;
   (i) a vehicle controller having said motor, said position coordinate system, said navigation sensor, and said speech recognition unit interfaced thereto, said controller being programmed to control navigation of said vehicle in cooperation with said position coordinate system in response to learned paths between locations of said environment, in response to said coded vocal commands, and in response to obstacles sensed by said navigation sensor;
   (j) said vehicle controller being programmed with artificial intelligence to enable said vehicle controller to learn patterns of values of locations and navigational parameters of said vehicle sensed by said position coordinate system and navigation sensors and in response to vocal commands from said occupant to thereby adapt navigation of said vehicle in response to said patterns of values and vocal commands;
   (k) a telecommunication device interfaced to said vehicle controller and operative to regularly communicate reports of locations and navigational parameters of said vehicle and to a remote monitoring center, to report selected patterns of values of said locations and navigational parameters to said monitoring center, and to communicate with said monitoring center in response to vocal commands from said occupant;
   (l) said vehicle controller is programmed to construct a map of an environment of said vehicle and to update said map in response to detecting structures and objects within said environment by said navigation sensor and position coordinate system and in response to vocal commands from said occupant; and
   (m) an automated personal assistance system interfaced to said vehicle controller and said telecommunication device, said automated personal assistance system including:
      (1) a plurality of environmental sensors positioned at a residence and sensing respective environmental parameters of an environment of said residence;
      (2) a plurality of occupant sensors sensing occupant parameters of an occupant of said residence including a current location of said occupant within said residence and a history of locations of said occupant;
      (3) a plurality of environmental actuators controllable to vary said environmental parameters of said residence;
      (4) a residence speech recognition unit including a microphone operable to receive and interpret vocal commands from said occupant;
      (5) an assistance controller having said environmental and occupant sensors, said environmental actuators, and said speech recognition unit interfaced thereto and said vehicle controller remotely interfaced thereto;
      (6) said assistance controller being programmed to control said environmental parameters by way of said environmental actuators in response to values of said environmental and occupant parameters sensed by said environmental and occupant sensors and/or in response to vocal commands from said occupant; and
      (7) said interfacing among said automated personal assistance system, said vehicle and said telecommunication device being configured for: directing operation of said vehicle in response to output from said personal assistance system; interfacing said vehicle sensors, including said environment and occupant sensors, with said personal assistance system and said telecommunication device; communicating vehicle operating information with said vehicle occupant via said personal assistance system; transmitting vehicle operating information via said telecommunication device; and assisting said vehicle occupant via said personal assistance system based on outputs from said vehicle sensors.

* * * * *